Nov. 22, 1966     P. W. KUNST     3,286,348
CELLULAR PLASTIC SKIVER
Filed March 10, 1965
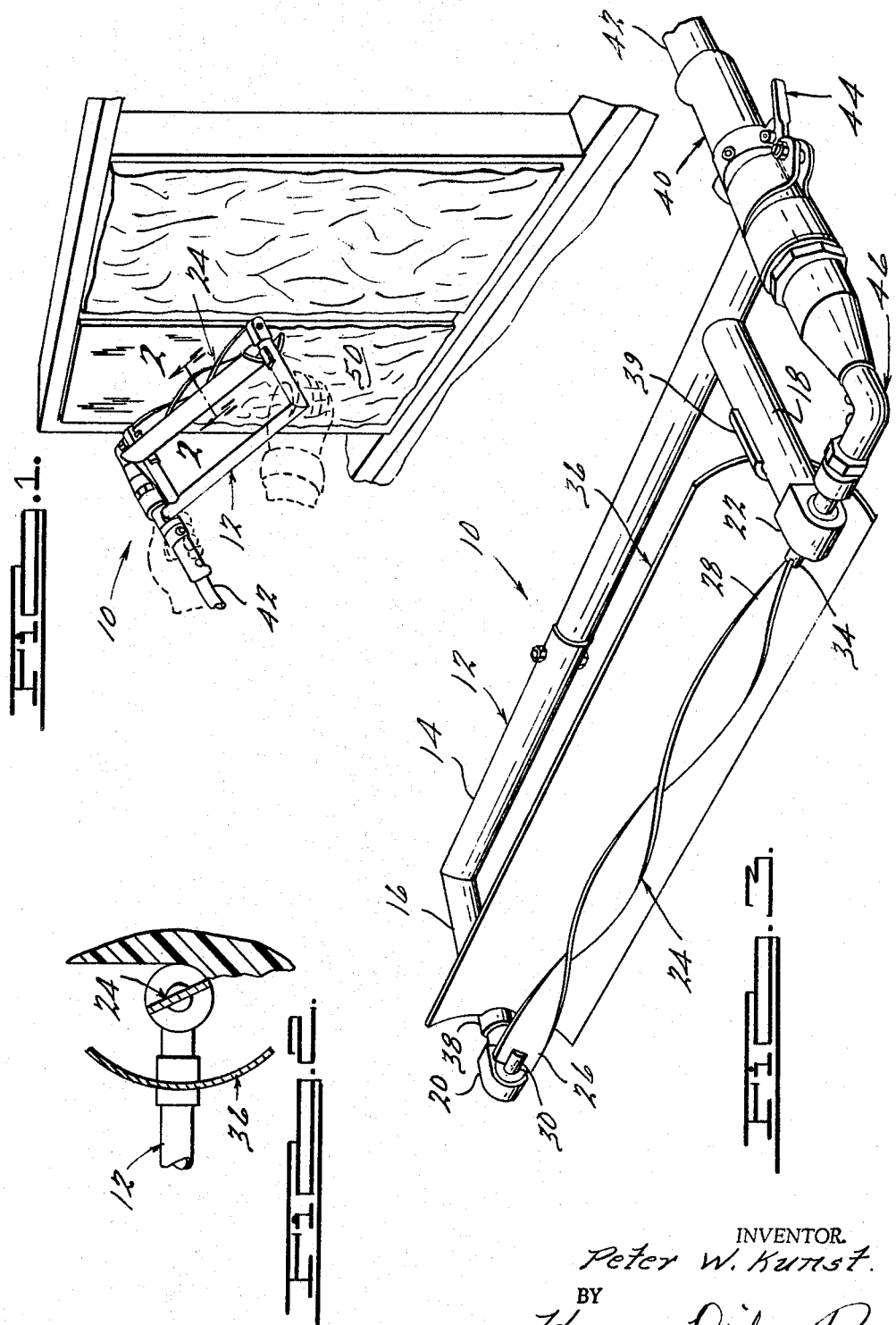
INVENTOR.
Peter W. Kunst.
BY
Harness, Dickey & Pierce
ATTORNEYS.

3,286,348
CELLULAR PLASTIC SKIVER
Peter William Kunst, Utica, Mich., assignor to Fruehauf Corporation, Detroit, Mich., a corporation of Michigan
Filed Mar. 10, 1965, Ser. No. 438,689
1 Claim. (Cl. 30—289)

This invention relates generally to skiving tools and more particularly to a tool for skiving the surface of rigid synthetic cellular structures.

Rapid advances in synthetic cellular structure technology, often termed "plastic foam," have led to increases in both the total utilization of such foam and improvements in the methods of utilization. Initially, rigid foam was produced in bulk, cut to size in the form of blocks or sheets, and thereafter fitted and mechanically retained within an assembly. Modern foam mixes permit pouring or injection of the foam mix directly into the cavity wherein the foam is ultimately to be used whereupon the foam expands to the configuration of the cavity and rigidifies.

However, the nature of the synthetic foam is such that the expansion necessary to form the cellular structures is incapable of precise control. Thus, while the liquid foam mix seeks its own level in a cavity into which it is poured, the resultant rigid foam has a relatively rough and an uneven upper surface due to unequal expansion of the foam cells. If the foamed cavity is to be closed, the relatively uneven surface of the foam must either be cut off to preclude interference with the cover member or the cavity must be incompletely filled with foam to provide clearance. The latter expedient results in a void within the cavity which is often undesirable.

No satisfactory means has heretofore been proposed for cutting such foam in situ. The heretofore proposed band or circular saws are relatively cumbersome and, in many cases, impossible to position relative to the workpiece. Furthermore, modern foams can be applied by spraying whereupon the foam expands away from the surface to which it is applied, whether it be vertical, overhead, etc. Irregularity in the surface as well as the difficulty of applying a wet material that expands thirty times its original volume makes it difficult to hold final surface tolerance of, for example, plus or minus ⅛".

The cellular plastic skiver of the instant invention solves the aforementioned problem in a unique manner. The skiver of the instant invention comprises a rotatable helical blade. The blade is supported in a relatively light and mobile frame which also supports a motor that effects rotation of the skiver blade. The bearings for the blade are engageable with the workpiece to control the depth of cut of the blade.

Accordingly, one object of the instant invention is a skiver for rapidly smoothing the surface of rigid plastic foam.

Another object is a foam skiver that is relatively light.

Another object is a foam skiver that has relatively few components.

Another object is a foam skiver that cuts foam without multilating the foam cells adjacent to the cut.

Another object is a foam skiver that does not produce obnoxious odors.

Other objects and advantages of the instant invention will be apparent from the following specification, claims and drawings, wherein:

FIGURE 1 is a perspective view of the skiver of the instant invention shown in operative association with a panel provided with foamed-in-place insulation;

FIG. 2 is a cross-sectional view of the skiver taken along the line 2—2 of FIG. 1; and FIG. 3 is an enlarged perspective view of the skiver.

As best seen in FIGURE 3 of the drawings, a cellular plastic skiver 10 comprises a generally U-shaped frame 12 having a bight portion 14 and leg portions 16 and 18. The leg portions 16 and 18 are provided with bearings 20 and 22 at the terminals ends thereof, respectively, for the support of a rotatable helical blade 24.

The helical blade 24 comprises an elongated strip of tool steel that is twisted into a helix. Opposite ends 26 and 28 of tthe blade 24 are secured to a pair of stub shafts 30 and 34, as by welding, which in turn are journaled in the bearings 20 and 22, respectively. It is to be noted that the bearings 20 and 22 serve to control the depth of cut of the blade 24.

An arcuate protective shield 36 extends generally parallel to the blade 24 and is secured to the legs 16 and 18 by a pair of clips 38 and 39 which grip the legs 16 and 18.

The blade 24 is driven, in an exemplary constructed embodiment, by a high speed air motor 40 which turns at, for example, 27,000 r.p.m. The motor 40 is connected to a suitable source of high pressure air (not shown) by a flexible conduit 42. The output of the air motor 40 is reduced to, for example, 2500 r.p.m. which has been found to be well suited to the skiving of plastic foam. The air motor 40 is controlled by a manually operable valve 44. The air motor 40 is provided with a 90° angle drive 46 which couples directly to the stub shaft 34 of the blade 24.

As best seen in FIGURE 1 of the drawings, the skiving tool 10 is held by an operator against the relatively uneven surface 50 of the workpiece. The tool is merely moved across the surface 50 of the foam material to skive the surface into a relatively smooth and flat condition.

From the foregoing it should be apparent that the cellular plastic skiving tool of the instant invention teaches a new concept for smoothing the surface of foamed-in-place material. The tool is relatively simple and light in construction and utilizes a minimum of components.

The helical blade allows relatively uniform power absorption in contrast to, for example, a flat blade which would have severe power peak requirements with consequent need for heavier mechanical power components.

In addition, the helical blade avoids sudden and big bites into the foam as one or more portions of blade length are always in contact with foam. A flat blade could be relatively easily installed.

The helical blade allows a slicing action on foam, for example, a razor blade does a better job when pulled but with the blade at an angle rather than at 90° to pull.

The helical blade, in addition to slicing action, does not, by its geometry of motion, slice off a layer of foam instantaneously (as with a flat blade). A revolution is required for a slice. This means that foam is not subjected to an instantaneous tearing action across the entire width of cut so that less tearing and digging results.

If it is desired to use a relatively long blade, for example, 48" long, it could be supported by a third bearing at the center of the blade.

It is to be understood that the specific construction of the improved skiver herein disclosed and described is presented for the purpose of explanation and illustration and is not intended to indicate limits of the invention, the scope of which is defined by the following claim.

What is claimed is:

A tool for skiving the surface of a rigid cellular plastic structure comprising a U-shaped frame defined by a bight portion and spaced leg portions, a pair of aligned bearings on the ends of the leg portions of said frame, respectively, an elongated relatively thin blade having parallel sides twisted so as to define helical edges on opposite sides of the longitudinal axis thereof, said blade being supported by said bearings for rotation about its own longitudinal axis, said bearings extending radially outwardly from the axis of rotation of said blade a distance substantially equal to the radius of said blade whereby said bearings are engageable with said plastic structure to control the depth of cut thereinto, and motor means on said frame for rotating said blade.

References Cited by the Examiner

UNITED STATES PATENTS 2,987,970  6/1961  Watson.

FOREIGN PATENTS 1,360,546  3/1964  France.

WILLIAM FELDMAN, *Primary Examiner.*

JAMES L. JONES, Jr., *Examiner.*